United States Patent
Smolarek

(10) Patent No.: US 7,118,701 B1
(45) Date of Patent: Oct. 10, 2006

(54) MOLD FOR MANUFACTURING A STICK OF COSMETIC PRODUCT

(75) Inventor: Francois Smolarek, Claye Souilly (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/592,284

(22) Filed: Jun. 12, 2000

(30) Foreign Application Priority Data

Jun. 15, 1999 (FR) .................................. 99 07535

(51) Int. Cl.
*B29C 33/44* (2006.01)

(52) U.S. Cl. .................. 264/313; 249/127; 249/134; 425/440; 425/DIG. 32; 425/DIG. 44

(58) Field of Classification Search ............... 249/117, 249/127, 134; 425/440, DIG. 32, DIG. 44; 264/313

See application file for complete search history.

(56) References Cited

U.S. PATENT DOCUMENTS

| | | | |
|---|---|---|---|
| 2,942,298 A * | 6/1960 | Loedding | 425/354 |
| 3,934,810 A * | 1/1976 | Henning | 249/117 |
| 3,937,438 A * | 2/1976 | Fox et al. | 249/117 |
| 5,067,887 A * | 11/1991 | Speer et al. | 425/256 |
| 6,197,359 B1 * | 3/2001 | Llorente Hompanera | 426/523 |

FOREIGN PATENT DOCUMENTS

| | | |
|---|---|---|
| EP | 0 020 248 A1 | 12/1980 |
| FR | 2 343 574 | 10/1977 |
| JP | A-6-46757 | 2/1994 |
| WO | WO 89/01366 | 2/1989 |

* cited by examiner

*Primary Examiner*—Donald Heckenberg
(74) *Attorney, Agent, or Firm*—Oliff & Berridge, PLC

(57) ABSTRACT

The invention relates to a mold for manufacturing a stick, in particular for cosmetic use. The side wall of said mold has zones of weakness for making the mold easier to deform radially, said zones of weakness being obtained by means of recesses formed in the side wall of the mold and extending longitudinally over substantially the entire height of the mold starting from its bottom end.

110 Claims, 1 Drawing Sheet

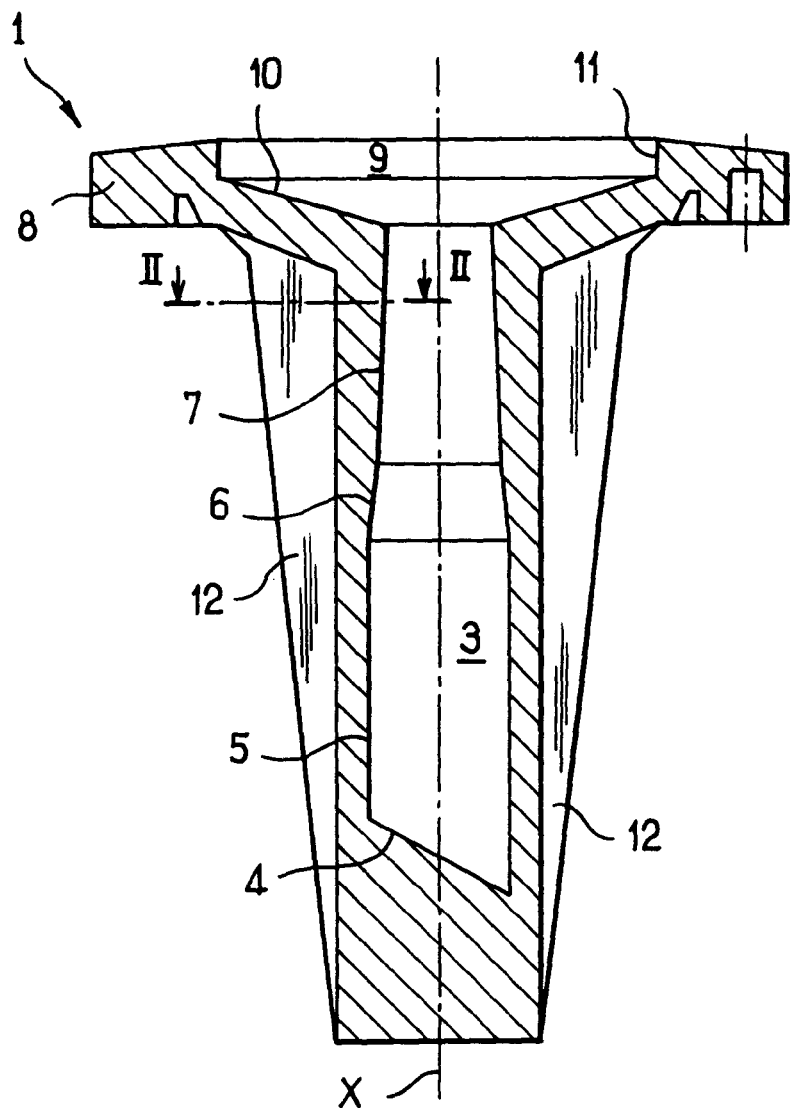
FIG_1
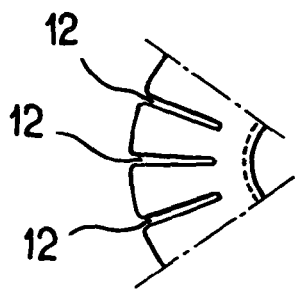
FIG_2

MOLD FOR MANUFACTURING A STICK OF COSMETIC PRODUCT

The present invention relates to a mold for manufacturing sticks, in particular for cosmetic use.

The invention is particularly adapted to making sticks for lipsticks, deodorants, or blusher wands.

BACKGROUND OF THE INVENTION

European patent application EP-A-0 686 468 discloses a method of manufacturing lipstick sticks.

That known method uses a flexible mold which is thermally conditioned prior to introducing therein a predetermined quantity of a composition in the molten state for constituting a lipstick stick after it has cooled and solidified.

The stick is unmolded in two stages.

In a first stage, suction is applied to the outside of the mold, but at its top end only, so as to cause said top end to expand and provide annular clearance around the stick inside the mold.

This clearance enables the stick to be engaged in an extractor member, e.g. constituted by the cup of a lipstick case, while the bottom portion of the stick continues to be held by the mold.

In a second stage, once the extractor member has been engaged on the stick, suction is exerted on the outside of the mold over its entire height so as to separate the bottom portion of the stick from the mold, thereby facilitating removal of the stick.

The material selected for making the mold must satisfy various requirements, and in particular:

it must be physically and chemically compatible with the stick-constituting composition;

it must withstand the temperature of said composition in the molten state, i.e. about 100° C.;

it must withstand the mechanical and thermal stresses to which it is subjected during a stick-manufacturing cycle; and it must be dimensionally stable.

OBJECTS AND SUMMARY OF THE INVENTION

The present invention seeks to make it easier to select the material for constituting the mold, for example in order to make it possible to use materials that enable the lifetime of the mold to be extended.

The invention achieves this by the fact that the side wall of the mold includes zones of weakness facilitating radial deformation thereof.

Thus, in the invention, the ability of the mold to deform in order to unmold the stick of lipstick is not only the result of the elasticity specific to the material used for making the mold, but also the result of the above-mentioned zones of weakness being present, and this presents numerous advantages.

In particular, the mold can be made out of materials that are less flexible than those presently in use but that have better strength, either because they have better chemical compatibility with the composition of the stick, for example, or, when the stick is made of material that has extrinsic plasticity obtained by adding a plasticizer, because it is possible to avoid problems associated with plasticizer exudation, thereby reducing plasticizer content, for example.

In a particular embodiment, it is possible to act on the outside shape of the mold to reduce the thicknesses of its walls, thereby simultaneously increasing the suitability of the mold for deformation and improving heat exchange.

In a particular embodiment, the zones of weakness are obtained by means of recesses made in the side wall of the mold.

Preferably, the recesses extend longitudinally over substantially the entire height of the mold all the way to its bottom end.

In a particular embodiment, the said recesses are constituted by notches that are uniformly distributed in the periphery of the mold.

Preferably, the bottoms of the notches are rounded so as to avoid creating tear starters in the wall of the mold.

Still in a particular embodiment, the depth of the notches decreases on coming closer to the bottom end of the mold.

The maximum depth of the notches can be greater than or equal to 4 mm, for example, and the mold may have 16 to 20 notches, for example.

The wall thickness of the mold in the zones of weakness can be greater than or equal to 1 mm, for example.

BRIEF DESCRIPTION OF THE DRAWING

Other characteristics and advantages of the invention will appear on reading the following detailed description of a non-limiting embodiment of the invention, and on examining the accompanying drawing, in which:

FIG. 1 is a diagrammatic axial section of a flexible mold; and

FIG. 2 is a fragmentary cross-section on section plane II—II of FIG. 1.

MORE DETAILED DESCRIPTION

The mold 1 shown in FIGS. 1 and 2 comprises an upwardly open cavity 3 having the shape of the stick that is to be made.

In the example described, the mold 1 is made of an elastomer material.

In particular, the mold can be made of a fluoro-silicone rubber, in particular one based on polysiloxanes, as described in patent EP-0 589 386, for example.

More specifically, it is possible to use a material of the kind sold by Dow Corning under the reference MX5412 or a material sold by Safic Alcan under the reference ALCAN SII S164V/100. Such materials are particularly suited to molding cosmetic compositions containing polydimethyl siloxane (PDMS) type silicone as used in certain kinds of lipstick.

The cavity 3 of the mold 1 has a sloping bottom wall 4 which joins a circularly cylindrical surface 5 about an axis of symmetry X which is itself extended upwards, about halfway up the cavity 3, by two successive conical surfaces 6 and 7 about the axis X and converging towards the opening of the mold.

The top portion of the mold 1 has a flange 8 for fixing it to conveyor means.

The conical surface 7 opens out into the bottom of a depression 9 that flares upwards, defined downwards by a conical surface 10 and radially by a cylindrical surface 11.

The diameter at the base of the cylindrical surface 5 in the example described is about 9 mm, and the flat 4 slopes at 650 relative to the axis X.

The outside shape of the mold 1 is generally frustoconical up to the flange 8 and it expands upwards. It is possible to vary the outside shape of the mold in order to decrease the thicknesses of its walls.

Longitudinal recesses 12 are uniformly distributed angularly around the axis X in the periphery of the mold 1 to facilitate radial deformation thereof in a manner described in greater detail below.

In the example described, the mold 1 has eighteen recesses 12 in the form of notches that are angularly spaced apart at 20° intervals.

By way of example, the width of each notch 12 is 0.5 mm.

The bottom of each notch 12 is rounded and extends parallel to the axis X from the bottom end of the mold 1 up to the base of the mold wall that defines the depression 9.

The recesses 12 create zones of weakness which make it easier to deform the mold radially as mentioned above, while the zones of greater thickness between the recesses 12 ensure that the shape of the mold remains stable while the composition is being cast and while it is cooling, in particular. As shown in FIG. 1, the recesses 12 creating the zones of weakness may extend longitudinally beyond a bottom wall 4 of an inner cavity of the mold.

The mold 1 can be used in conventional manner, as described in above-mentioned European patent application EP-A-0 686 468.

Naturally, the invention is not limited to making sticks of lipstick, but also applies to molding other compositions into the form of sticks.

The invention claimed is:

1. A mold for manufacturing a stick of a cosmetic product, wherein the mold has a side wall having an external surface and an internal surface configured to be in contact with the product, the side wall including recesses facilitating radial deformation of the mold, the side wall being deprived of recesses opening out into the internal surface, at least one of said recesses having longitudinal edges having a length on the external surface, the edges comprising portions that are adjacent to a periphery of the mold and spaced apart over at least a part of the length prior to a deformation of the mold, and spaced from an upper end of the recess and from a bottom end of the recess.

2. A mold according to claim 1, wherein said recesses extend longitudinally over substantially an entire height of the mold all the way to a bottom end of the mold.

3. A mold according to claim 1, wherein said recesses are constituted by notches that are uniformly distributed in a periphery of the mold.

4. A mold according to claim 3, wherein said notches have bottoms that are rounded.

5. A mold according to claim 3, wherein a depth of the notches decreases on coming towards a bottom end of the mold.

6. A mold according to claim 5, wherein a maximum depth of the notches is greater than or equal to 4 mm.

7. A mold according to claim 3, having sixteen to twenty said notches.

8. A mold according to claim 1, wherein a thickness of the side wall in the recesses is greater than or equal to 1 mm.

9. A mold according to claim 8, having eighteen said notches.

10. A mold for manufacturing a stick of a cosmetic product, wherein the mold has a side wall including recesses facilitating radial deformation of the mold, at least one of said recesses having longitudinal edges having a length on an external surface of the side wall, portions of the edges adjacent to a periphery of the mold being spaced apart over at least a part of the length prior to a deformation of the mold, said portions being located at a position other than an upper end and a bottom end of the recess and wherein the mold has a cavity with a sloping bottom wall.

11. A mold according to claim 10, wherein said recesses extend longitudinally over substantially an entire height of the mold all the way to a bottom end of the mold.

12. A mold according to claim 10, wherein said recesses are constituted by notches that are uniformly distributed in the periphery of the mold.

13. A mold according to claim 12, wherein said notches have bottoms that are rounded.

14. A mold according to claim 12, wherein a depth of the notches decreases on coming towards a bottom end of the mold.

15. A mold according to claim 14, wherein a maximum depth of the notches is greater than or equal to 4 mm.

16. A mold according to claim 12, having sixteen to twenty said notches.

17. A mold according to claim 16, having eighteen said notches.

18. A mold according to claim 10, wherein a thickness of the side wall in the recesses is greater than or equal to 1 mm.

19. A mold according to claim 10 having an external surface and an internal surface configured to be in contact with the product, the side wall being deprived of recesses opening out into the internal surface.

20. A mold for manufacturing a stick of a cosmetic product, wherein the mold has a side wall including recesses facilitating radial deformation of the mold, at least one of said recesses having longitudinal edges having a length on an external surface of the side wall, the edges comprising portions that are adjacent to a periphery of the mold and spaced apart over at least a part of the length prior to a deformation of the mold, and spaced from an upper end of the recess and from a bottom end of the recess, and wherein the mold has a cavity having a part formed by two successive conical surfaces converging towards an opening of the mold.

21. A mold according to claim 20, wherein said recesses extend longitudinally over substantially an entire height of the mold all the way to a bottom end of the mold.

22. A mold according to claim 20, wherein said recesses are constituted by notches that are uniformly distributed in a periphery of the mold.

23. A mold according to claim 22, wherein said notches have bottoms that are rounded.

24. A mold according to claim 22, wherein a depth of the notches decreases on coming towards a bottom end of the mold.

25. A mold according to claim 24, wherein a maximum depth of the notches is greater than or equal to 4 mm.

26. A mold according to claim 22, having sixteen to twenty said notches.

27. A mold according to claim 26, having eighteen said notches.

28. A mold according to claim 20, wherein a thickness of the side wall in the recesses is greater than or equal to 1 mm.

29. A mold according to claim 20, having an external surface and an internal surface configured to be in contact with the product, the side wall being deprived of recesses opening out into the internal surface.

30. A mold for manufacturing a stick of a cosmetic product, wherein the mold has a side wall including recesses facilitating radial deformation of the mold, at least one of said recesses having longitudinal edges having a length on an external surface of the side wall, the edges comprising portions that are adjacent to a periphery of the mold and spaced apart over at least a part of the length prior to a deformation of the mold, and spaced from an upper end of the recess and from a bottom end of the recess, and wherein the mold has a top portion having a flange.

31. A mold according to claim 30, wherein said recesses extend longitudinally over substantially the entire height of the mold all the way to a bottom end of the mold.

32. A mold according to claim 30, wherein said recesses are constituted by notches that are uniformly distributed in a periphery of the mold.

33. A mold according to claim 32, wherein said notches have bottoms that are rounded.

34. A mold according to claim 32, wherein a depth of the notches decreases on coming towards a bottom end of the mold.

35. A mold according to claim 34, wherein a maximum depth of the notches is greater than or equal to 4 mm.

36. A mold according to claim 32, having sixteen to twenty said notches.

37. A mold according to claim 36, having eighteen said notches.

38. A mold according to claim 30, wherein a thickness of the side wall in the recesses is greater than or equal to 1 mm.

39. A mold according to claim 30, having an internal surface configured to be in contact with the product, the side wall being deprived of recesses opening out into the internal surface.

40. A mold for manufacturing a stick of a cosmetic product, wherein the mold has a side wall including recesses facilitating radial deformation of the mold, at least one of said recesses having longitudinal edges having a length on an external surface of the side wall, the edges comprising portions that are adjacent to a periphery of the mold and spaced apart over at least a part of the length prior to a deformation of the mold, and spaced from an upper end of the recess and from a bottom end of the recess, and wherein the mold has a flange surrounding an opening of the mold.

41. A mold according to claim 40, wherein said recesses extend longitudinally over substantially an entire height of the mold all the way to a bottom end of the mold.

42. A mold according to claim 40, wherein said recesses are constituted by notches that are uniformly distributed in a periphery of the mold.

43. A mold according to claim 42, wherein said notches have bottoms that are rounded.

44. A mold according to claim 42, wherein a depth of the notches decreases on coming towards a bottom end of the mold.

45. A mold according to claim 44, wherein a maximum depth of the notches is greater than or equal to 4 mm.

46. A mold according to claim 42, having sixteen to twenty said notches.

47. A mold according to claim 46, having eighteen said notches.

48. A mold according to claim 40, wherein a thickness of the mold wall in the recesses is greater than or equal to 1 mm.

49. A mold according to claim 40, having an internal surface configured to be in contact with the product, the side wall being deprived of recesses opening out into the internal surface.

50. A mold for manufacturing a stick of a cosmetic product, wherein the mold has a side wall including recesses facilitating radial deformation of the mold, at least one of said recesses having longitudinal edges having a length on an external surface of the side wall, the edges comprising portions that are adjacent to a periphery of the mold and spaced apart over at least a part of the length prior to a deformation of the mold, and spaced from an upper end of the recess and from a bottom end of the recess, and wherein the mold has an opening defined at least partially by a conical surface, the conical surface having an internal surface configured to be in contact with the product, the side wall being deprived of recesses opening out into said internal surface.

51. A mold according to claim 50, wherein said recesses extend longitudinally over substantially the entire height of the mold all the way to a bottom end of the mold.

52. A mold according to claim 50, wherein said recesses are constituted by notches that are uniformly distributed in the periphery of the mold.

53. A mold according to claim 51, wherein said notches have bottoms that are rounded.

54. A mold according to claim 52, wherein the depth of the notches decreases on coming towards a bottom end of the mold.

55. A mold according to claim 54, wherein the maximum depth of the notches is greater than or equal to 4 mm.

56. A mold according to claim 52, having sixteen to twenty notches.

57. A mold according to claim 56, having eighteen notches.

58. A mold according to claim 50, wherein the thickness of the mold wall in the recesses is greater than or equal to 1 mm.

59. A mold according to claim 30, having a cavity with a sloping bottom wall.

60. A mold according to claim 40, having a cavity with a sloping bottom wall.

61. A mold according to claim 50, having a cavity with a sloping bottom wall.

62. A mold according to claim 1, configured to be filled with a cosmetic product.

63. A mold according to claim 10, configured to be filled with a cosmetic product.

64. A mold according to claim 20, configured to be filled with a cosmetic product.

65. A mold according to claim 30, configured to be filled with a cosmetic product.

66. A mold according to claim 40, configured to be filled with a cosmetic product.

67. A mold according to claim 50, configured to be filled with a cosmetic product.

68. A mold for manufacturing a stick of a cosmetic product, wherein the mold has a side wall including recesses, facilitating radial deformation of the mold, at least one of said recesses having longitudinal edges having a length on an external surface of the side wall, the edges comprising portions that are adjacent to a periphery of the mold and spaced apart over at least a part of the length prior to a deformation of the mold, and spaced from an upper end of the recess and from a bottom end of the recess, at least one of said recesses extending longitudinally beyond a bottom of an inner cavity of said mold.

69. A mold according to claim 68, having a cavity with a sloping bottom wall.

70. A mold according to claim 68, wherein said recesses are constituted by notches that are uniformly distributed in the periphery of the mold.

71. A mold according to claim 70, wherein said notches have bottoms that are rounded.

72. A mold for manufacturing a stick of a cosmetic product, wherein the mold has a side wall which includes notches facilitating radial deformation thereof, at least one of said notches extending longitudinally beyond a bottom of an inner cavity of said mold, and wherein the depth of the notches decreases on coming towards a bottom end of the mold.

73. A mold according to claim 72, wherein a maximum depth of the notches is greater than or equal to 4 mm.

74. A mold according to claim 70, having sixteen to twenty notches.

75. A mold according to claim 74, having eighteen notches.

76. A mold according to claim 68, wherein a thickness of the side wall in the zones of weakness is greater than or equal to 1 mm.

77. A mold according to claim 68, having an internal surface configured to be in contact with the product, the side wall being deprived of recesses opening out into the internal surface.

78. A mold according to claim 68, configured to be filled with a cosmetic product.

79. A method for manufacturing a stick of a cosmetic product, comprising:
  pouring said product in a mold having a side wall including recesses facilitating radial deformation of the mold, at least one of said recesses having longitudinal edges having a length on an external surface of the side wall, the edges comprising portions that are adjacent to a periphery of the mold and spaced apart over at least a part of the length prior to a deformation of the mold, and spaced from an upper end of the recess and from a bottom end of the recess, and
  wherein the mold has at least one of:
    the side wall being deprived of recesses opening out into an internal surface of the side wall;
    a cavity with a sloping bottom wall;
    a cavity having a part formed by two successive conical surfaces converging towards an opening of the mold;
    a top portion having a flange;
    a flange surrounding an opening of the mold;
    an opening defined at least partially by a conical surface, the conical surface having an internal surface configured to be in contact with the product, the side wall being deprived of recesses opening out into said internal surface; and
    at least one of said recesses extending longitudinally beyond a bottom of an inner cavity of said mold.

80. A method according to claim 79, wherein said recesses extend longitudinally over substantially the entire height of the mold all the way to a bottom end of the mold.

81. A method according to claim 79, wherein said recesses are constituted by notches that are uniformly distributed in the periphery of the mold.

82. A method according to claim 81, wherein said notches have bottoms that are rounded.

83. A method according to claim 81, wherein the depth of the notches decreases on coming closer to a bottom end of the mold.

84. A method according to claim 83, wherein the maximum depth of the notches is greater than or equal to 4 mm.

85. A method according to claim 81, having sixteen to twenty notches.

86. A method according to claim 85, having eighteen notches.

87. A method according to claim 79, wherein the thickness of the side wall in the zones of weakness is greater than or equal to 1 mm.

88. A method according to claim 79, having an internal surface configured to be in contact with the product, the side wall being deprived of recesses opening out into the internal surface.

89. A method according to claim 79, further comprising applying a suction to an outside of the mold for expanding the mold.

90. A mold for manufacturing a stick, wherein the mold has at least one notch facilitating radial deformation of said mold, said notch having longitudinal edges having a length on an external surface of the mold, the edges comprising portions that are adjacent to a periphery of the mold and spaced apart over at least a part of the length prior to a deformation of the mold, and spaced from an upper end of the recess and from a bottom end of the recess, and said notch having a depth decreasing along a length of said notch towards a bottom end of the mold.

91. A mold according to claim 90, wherein the at least one notch comprises a plurality of notches.

92. A mold for manufacturing a stick, wherein the mold comprises at least one notch facilitating radial deformation of said mold, said notch having a depth decreasing along a length of said notch towards a bottom end of the mold, and wherein said notches extend longitudinally over substantially an entire height of the mold all the way to the bottom end of the mold.

93. A mold according to claim 91, wherein said notches are uniformly distributed at a periphery of the mold.

94. A mold according to claim 90, wherein the at least one notch comprises a bottom that is rounded.

95. A mold according to claim 90, wherein a maximum depth of the at least one notch is greater than or equal to 4 mm.

96. A mold according to claim 91, wherein the at least one notch comprises sixteen to twenty notches.

97. A mold according to claim 90, wherein a thickness of the side wall in the at least one notch is greater than or equal to 1 mm.

98. A mold according to claim 96, wherein the at least one notch comprises eighteen notches.

99. A mold according to claim 90, wherein the mold has a cavity with a sloping bottom wall.

100. A mold according to claim 90, wherein the mold has a cavity having a part formed by two successive conical surfaces converging towards an opening of the mold.

101. A mold according to claim 90, wherein the mold has a top portion having a flange.

102. A mold according to claim 90, wherein the mold has a flange surrounding an opening of the mold.

103. A mold according to claim 90, wherein the mold has an opening defined at least partially by a conical surface.

104. A mold according to claim 90, having an internal surface configured to be in contact with the product, the side wall being deprived of recesses opening out into the internal surface.

105. A mold according to claim 90, configured to be filled with a cosmetic product.

106. A mold for manufacturing a stick, wherein the mold has at least one notch facilitating radial deformation of said mold, said notch having longitudinal edges having a length on an external surface of the mold, portions of the edges adjacent to a periphery of the mold being spaced apart over at least a part of the length prior to a deformation of the mold, and said notch having a depth decreasing along a length of said notch towards a bottom end of the mold, wherein the at least one notch extends longitudinally beyond a bottom of an inner cavity of said mold.

107. A method according to claim 79, wherein the product is poured at a temperature of about 100° C.

108. A method according to claim 79, wherein the product contains polydimethyl siloxane silicone.

109. A mold according to claim 1, wherein the mold is made of a material that is physically and chemically compatible with polydimethyl siloxane silicone at a temperature of about 100° C.

110. A mold according to claim 1, wherein the mold is made of fluoro silicone rubber.

* * * * *